United States Patent
Yokota et al.

[19]

[11] Patent Number: 6,102,072
[45] Date of Patent: Aug. 15, 2000

[54] WATER-HAMMERLESS CHECK VALVE

[75] Inventors: Hiroshi Yokota, 11-11-302, Midori 1-chome, Minami-ku, Hiroshima-shi; Shingo Yokota, Hiroshima, both of Japan

[73] Assignees: Kabushiki Kaisha Yokota Seisakusho; Hiroshi Yokota, both of Hiroshima-Ken, Japan

[21] Appl. No.: 09/155,725

[22] PCT Filed: Apr. 9, 1997

[86] PCT No.: PCT/JP97/01201

§ 371 Date: Oct. 5, 1998

§ 102(e) Date: Oct. 5, 1998

[87] PCT Pub. No.: WO97/38250

PCT Pub. Date: Oct. 16, 1997

[30] Foreign Application Priority Data

Apr. 9, 1996 [JP] Japan .................................... 8-086288

[51] Int. Cl.[7] .................................................. F16K 47/02
[52] U.S. Cl. .................. 137/599; 137/512.3; 137/514.7; 137/527.8
[58] Field of Search ................. 137/599, 512.3, 137/514.7, 527.8

[56] References Cited

U.S. PATENT DOCUMENTS

| 419,447 | 1/1890 | Hussey | 137/514.7 |
|---|---|---|---|
| 1,029,600 | 6/1912 | Foster | 137/514.7 |
| 2,930,400 | 3/1960 | Wheatley | 137/527.8 |
| 3,144,045 | 8/1964 | Fitzpatrick | 137/527.8 |
| 3,144,876 | 8/1964 | Frye | 137/527.8 |
| 4,217,931 | 8/1980 | Jaekel | 137/514.7 |
| 4,617,959 | 10/1986 | Yamada | 137/514.7 |
| 5,746,246 | 5/1998 | Yokota . | |
| 5,769,116 | 6/1998 | Yokota . | |

FOREIGN PATENT DOCUMENTS

| 34-28874 | 3/1959 | Japan . |
|---|---|---|
| 40-3654B | 2/1965 | Japan . |
| 51-25930B | 8/1976 | Japan . |
| 61-94664 | 6/1986 | Japan . |
| 63-60274B | 11/1988 | Japan . |
| 3-24377 | 2/1991 | Japan . |
| 7-293721 | 11/1995 | Japan . |

*Primary Examiner*—Stephen M. Hepperle
*Attorney, Agent, or Firm*—Ladas & Parry

[57] ABSTRACT

The present invention is intended to provide an economically advantageous, high-performance water hammer preventing check valve capable of preventing both water hammer and pressure rise under any pipeline conditions when feed of a fluid is stopped and of easily designed and manufactured. The invention provides a water hammer preventing check valve which opens when a fluid is fed forward and closes when the feed of the fluid is stopped to prevent the fluid from reversing. The check valve has a main valve unit and a bypass valve unit disposed in parallel, wherein the main valve unit has a single main valve element capable of opening and closing an opening defined by an inclined main valve seat disposed between an inlet passage and an outlet passage, constantly biased in a valve closing direction, formed in a shape subject to a low form drag and providing a small inertial resistance, and capable of being substantially completely seated on the main valve seat at the moment the velocity of the inertial flow of the fluid in a discharge direction decreases to naught after the supply of the fluid has been stopped; and the bypass valve unit has a bypass valve element capable of linearly moving in opposite directions to open and close an opening defined by a bypass valve seat disposed between the inlet passage and the outlet passage, and linked to a damping device for damping the linear movement of the bypass valve element so that the bypass valve element may gradually close the opening defined by the bypass valve seat after the start of the reverse flow of the fluid.

The bypass valve unit may be provided with an opening adjusting mechanism for adjusting the opening of the bypass valve element. The main valve unit may be provided with a valve closing force adjusting mechanism for applying a valve closing force to the main valve element.

4 Claims, 5 Drawing Sheets

WATER-HAMMERLESS CHECK VALVE

TECHNICAL FIELD

The present invention relates to a water hammer preventing check valve to be installed in a pipeline for transporting a fluid, capable of surely and safely preventing water hammer due to the reverse flow of a fluid in the pipeline and pressure rise in the same when the supply of power to a pump is stopped suddenly to stop the transportation of the fluid.

In this specification, the term, "water" is used for the general designation of fluids. The terms, "upstream side", "downstream side (discharge side)", "inlet" and "outlet" are used to designate positions and directions with respect to the direction of normal flow (not the reverse flow) of a fluid.

BACKGROUND ART

When a pump is stopped to stop supplying a fluid, such as water, a check valve installed in a pipeline for conveying the fluid is often unable to deal with a sudden change in the state of the fluid, i.e., normal flow →stop →reverse flow, the check valve closes with a delay, and the valve element of the check valve is seated on the valve seat of the same after the start of the reverse flow of the fluid. Consequently, water hammer is created in a section of the pipeline on the downstream side of the check valve at the moment the check valve is closed, which sometimes cause a serious trouble.

Inventions relating to check valves for preventing such water hammer are disclosed in, for example, JP-40-3654B (Water Hammer Preventing Pumping Apparatus), JP-51-25930B (Improvements in Water Hammer Preventing Pumping Apparatus), and JP-63-60274 B(Swing Type Water Hammer Preventing Check Valve). These inventions will inclusively be designated as "original inventions". As is generally known, those prior art check valves have prevalently been used. The present invention relates to improvements in the water hammer preventing check valves of the original inventions.

The prior art water hammer preventing check valves of the original inventions are based on clear technical ideas surpassing generally known symptomatic technical ideas of preventing water hammer (symptomatic means which allows the valve element to be seated on the valve seat after the start of reverse flow, and retards the operation of the valve element by a damping means or installs an automatic valve and a surge tank in the pipeline to relieve shocks). It can readily be gathered from descriptions in the specifications of the original inventions that the technical ideas on which the original inventions are based include radical improvements intended to stop a reverse flow in a pipeline for the positive elimination of causes of water hammer by forming a valve element and flow passages around the valve element so that the valve element is seated substantially on a valve seat at the moment the inertial flow of a fluid in a discharge direction in the pipeline stops when the conveyance of the fluid is interrupted.

As shown by way of example in FIG. 3, a water hammer preventing check valve of the original invention is constructed so as to eliminate as many factors obstructing a valve closing motion as possible as indicated by solid lines; that is, a valve element is designed so that the valve element has an adjusted shape and a reduced mass, provides the least possible inertial resistance, and is subject to the lowest possible form drag or shape drag. This valve element is capable of performing an appropriate closing motion by its own weight in quick response to the reduction of the flow velocity of the fluid, small errors can be corrected by an additional valve closing force exerted by a weight or a spring, and thereby water hammer can be nearly perfectly prevented.

However, even the water hammer preventing check valve of the original inventions has an unsolved technical problem that "pressure rise" after the valve has closed cannot be prevented.

If the valve closes without delay, the velocity of water (fluid) at a position in front of the valve seat and that of water at a position behind the valve seat at the moment the valve element is seated on the valve seat are approximately zero. Therefore, theoretically, water hammer will not occur. However, a water column on a discharge side is extended by its own elasticity under the influence of resistances exerted by a pump and the check valve, and it sometimes occurs that a pressure wave generated when the water column contracts to its original length is checked by the closed check valve to cause a pressure rise. Since such a phenomenon occurs after the check valve has closed, the water hammer preventing check valve of the original inventions is unable to deal with such a phenomenon. Shocks caused by the pressure rise is not as great as those caused by the water hammer and are practically ignorable in most cases. However, under some pipeline conditions, particularly when the length of the pipeline on the discharge side is long, the adverse influence of the shocks caused by the pressure rise can be serious.

On the other hand, prior art slow-closing check valves shown in FIGS. 4 and 5 by way of example are known to be capable of preventing such a pressure rise. Particularly, a slow-closing bypass check valve which is provided with a bypass valve element controlled by a dashpot has prevalently been used.

However, the prior art slow-closing bypass check valve has the following problems.

The slow-closing bypass check valve employs a general check valve, which is liable to delay in valve closing action, as a main valve. When the main valve delays in valve closing action, a main valve element is seated on a valve seat after the flow has reversed. Therefore, measures, such as the employment of a double valve element and the reinforcement of the valve shaft and the associated parts, must be taken to prevent the water hammer prior to the prevention of the pressure rise. Moreover, the bypass valve must unavoidably be formed in a mechanism which permits the reverse flow of a large amount of the fluid and closes in a considerable time to relieve shocks exerted by the water hammer. Accordingly, the bypass valve must be formed in a predetermined bore diameter generally equal to about ⅓ to about ¼ of the bore diameter of the main valve. Consequently, many design consideration are inevitably necessary for the reinforcement of the component parts and the dashpot, and the scale and complexity of the peripheral devices and mechanisms associated with the bypass valve exceeds those of the bypass valve element which is a principal functional part, so that the check valve has a complex construction. Generally, the bypass valve is mounted on a main valve casing because the bypass valve takes up a considerably large space. However, a large check valve of such a construction has a great height and requires a troublesome work for maintenance, inspection and the adjustment of the dashpot.

Originally, the check valve is used to prevent the reverse flow of a fluid once conveyed forward by energy. Therefore the permission of the reverse flow of a large quantity of the fluid even for shock relieving is quite wasteful and conflicts with the original purpose of the check valve. Accordingly, the quantity of the fluid allowed to reverse must be limited to the least possible extent which will not cause water hammer and pressure rise. Although the closing speed of the bypass valve element of the prior art slow-closing bypass check valve can be adjusted by adjusting the needle valve of the appended dashpot, it is difficult to limit the reverse flow of the fluid by adjusting the size of the bypass passage at the start of the reverse flow (the starting position of the bypass valve element) because the limitation of the reverse flow of the fluid may possibly obstruct the operation of the bypass valve element supposed to allow the reverse flow of a large quantity of the fluid.

Accordingly, it is an object of the present invention to provide an ideal, economically advantageous, high-performance water hammer preventing check valve capable of solving all the problems in the prior art radically, based on a technical idea developed by incorporating improvements into the technical idea of exactly preventing water hammer by controlling a valve element for a closing motion in quick response to the reduction of the velocity of a fluid, on which the water hammer preventing check valve of the original inventions is based, making the best use of the original inventions' advantages for a main valve, provided with a small bypass valve permitting the reverse flow of only a small quantity of a fluid, capable of preventing both water hammer and pressure rise under any pipeline conditions, having a mechanism facilitating the adjustment of the quantity of the reverse flow, provided with a compact main valve and a compact bypass valve, having a reasonable construction not subject to excessive forces, and capable of being easily designed and manufactured.

DISCLOSURE OF THE INVENTION

With the foregoing object in view, the present invention provides a check valve which opens when a fluid is fed forward and closes when the feed of the fluid is stopped to prevent the fluid from reversing, comprising:

a main valve unit and a bypass valve unit disposed in parallel;

characterized in that:

the main valve unit has a single main valve element which is capable of opening and closing an opening defined by an inclined main valve seat disposed between an inlet passage and an outlet passage, and always biased in a valve closing direction, the main valve element being formed in a shape subject to a low shape drag and providing a small inertial resistance, and being capable of being substantially completely seated on the main valve seat at the moment the velocity of the inertial flow of the fluid in a discharge direction decreases to naught after the supply of the fluid has been stopped; and the bypass valve unit has a bypass valve element capable of linearly moving in opposite directions to open and close an opening defined by a bypass valve seat disposed between the inlet passage and the outlet passage, the bypass valve element being linked to a damping device for damping the linear movement of the bypass valve element so that the bypass valve element may gradually close the opening defined by the bypass valve seat in the direction of the reverse flow of the fluid after the start of the reverse flow;

whereby water hammer and pressure rise due to the reverse fluid flow occurring upon the stoppage of the feed of the fluid are prevented.

The bypass valve unit may be provided With an opening adjusting mechanism for adjusting the opening of the bypass valve element.

The main valve unit may be provided with a valve closing force adjusting mechanism for adjusting force biasing the main valve element in a valve closing direction.

In the water hammer preventing check valve of the present invention, the main valve unit closes first, and then the bypass valve unit closes, being gradually damped by the damping device. Since the main valve element of the main valve unit is always biased in a valve closing direction and is formed in a shape subject to a low shape drag and providing a low inertial resistance, the main valve element starts a valve closing motion substantially simultaneously with the start of a sudden decrease in the velocity of the fluid in a discharge direction in a pipeline and is seated without delay on the main valve seat. Since the main valve thus closes substantially completely at the moment the flow of the fluid stops before the flow of the fluid reverses, a water hammer can be avoided by the main valve unit and hence the bypass valve unit needs only to avoid a pressure rise which occurs on the discharge side after the main valve unit has closed. Accordingly, the bypass valve unit of the water hammer preventing check valve of the present invention may be smaller than that of the prior art water hammer preventing check valve of the same capacity, the component parts of the bypass valve unit and the damping device can be easily and economically designed and manufactured, and the bypass valve unit can be attached to the main valve unit at an optional position, such as a position on the side surface of the main valve unit, and maintenance and inspection of the water hammer preventing check valve and the adjustment of the damping device can be easily carried out even if the water hammer preventing check valve is of a large size.

The quantity of the fluid that reverses can be limited to the least extent necessary to avoid the water hammer and pressure rise by adjusting the position from which the bypass valve element start moving upon the start of the reverse flow.

BEST MODE FOR CARRYING OUT THE INVENTION

Figure 1:
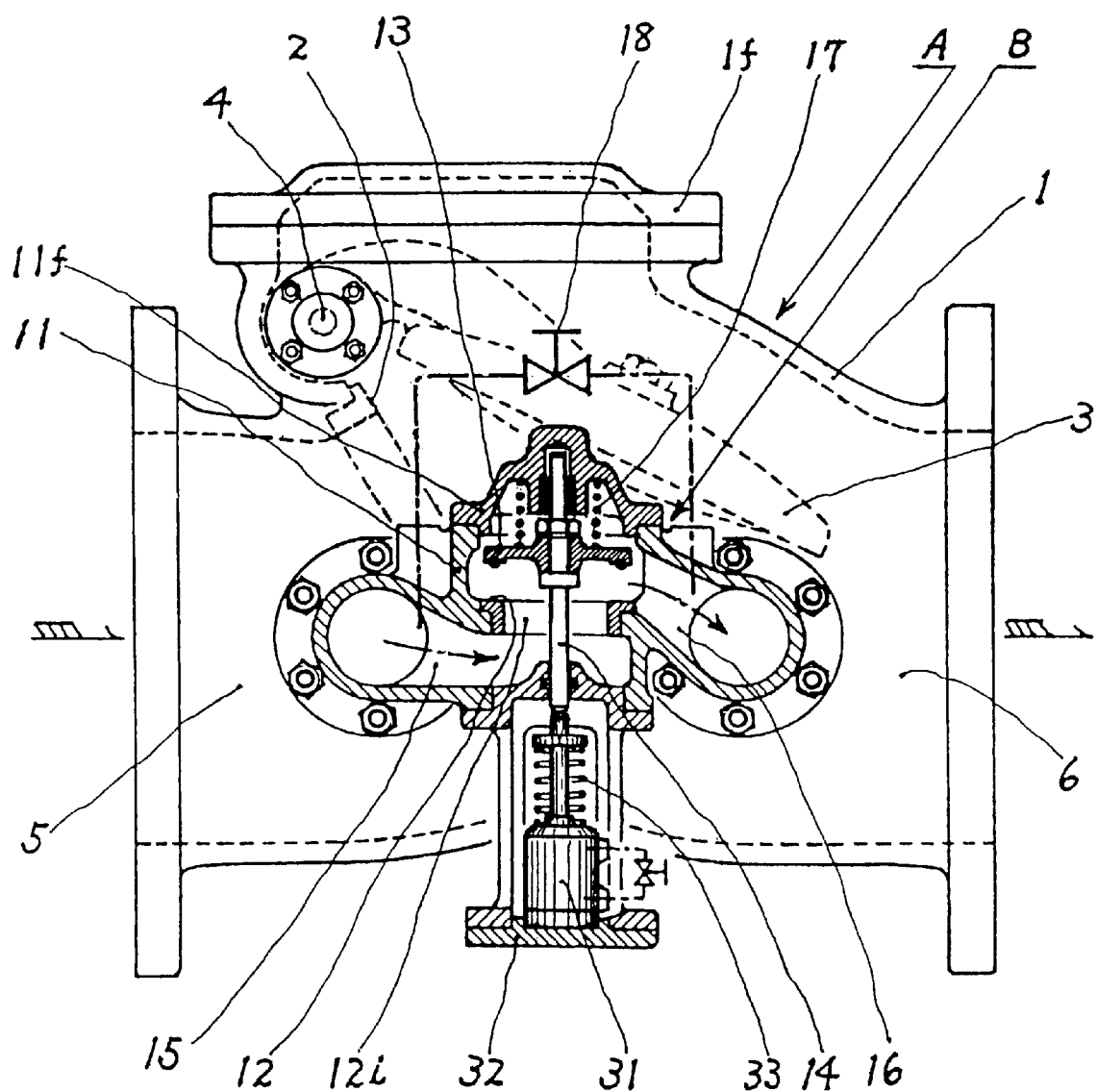
FIG. 1 is a view of a water hammer preventing check valve in an embodiment according to the present invention, showing a main valve unit in a fully open state in side elevation and a bypass valve unit in a fully open state in vertical section.
Figure 3:
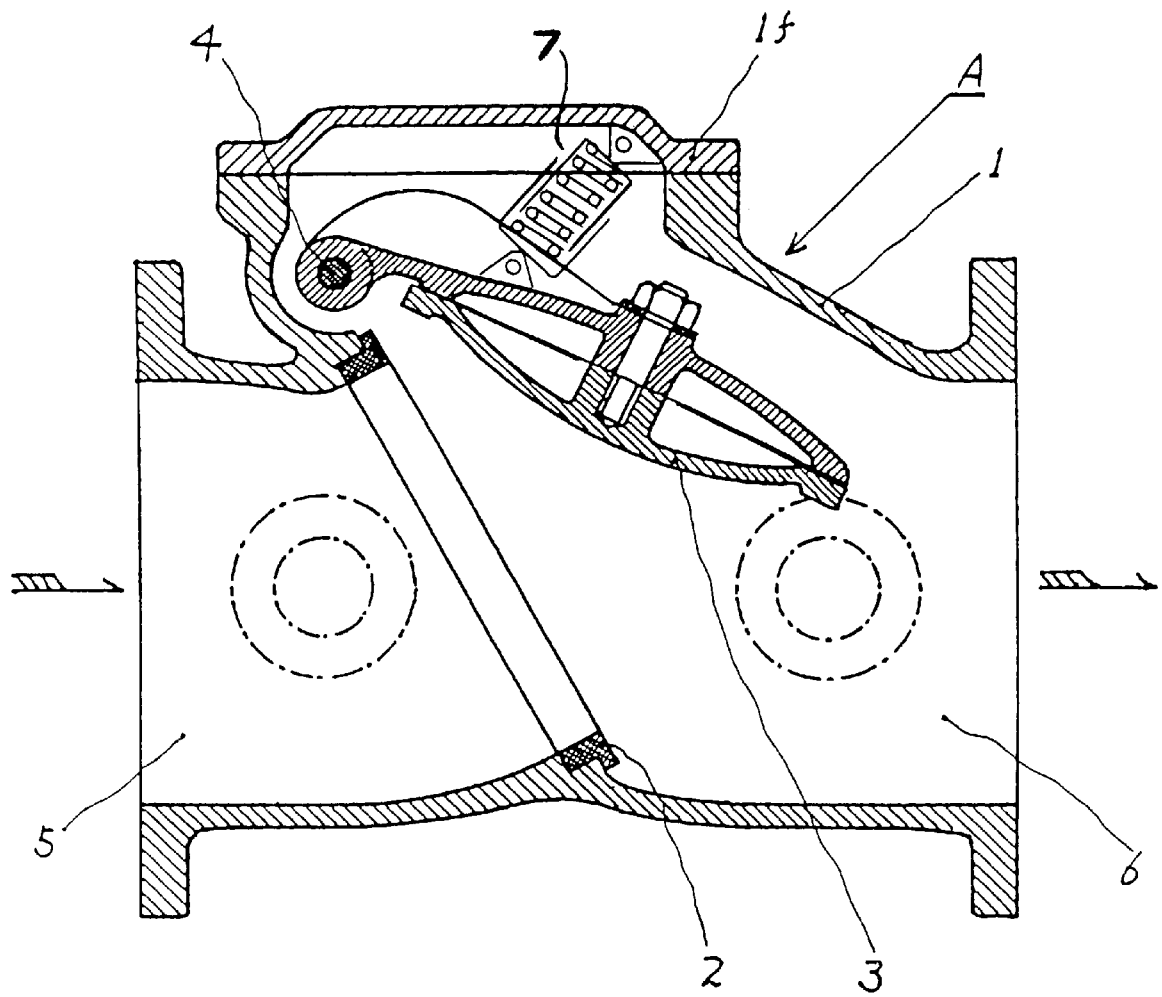
FIG. 3 is a vertical sectional view of the main valve unit of each of the foregoing embodiments, i.e., the water hammer preventing check valve of the invention.
Figure 4:
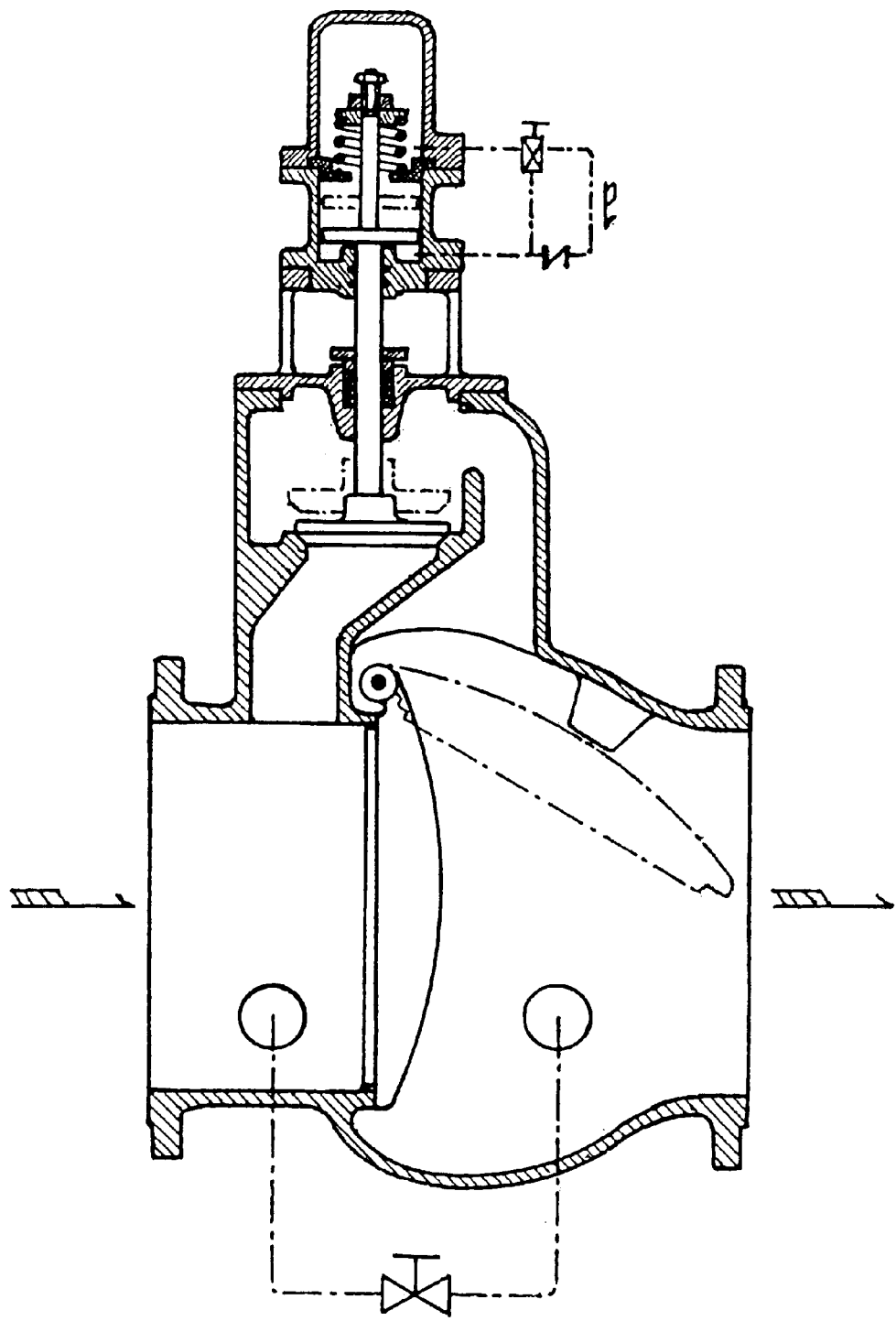
FIG. 4 is a vertical sectional view of a prior art slow-closing bypass check valve.
Figure 5:
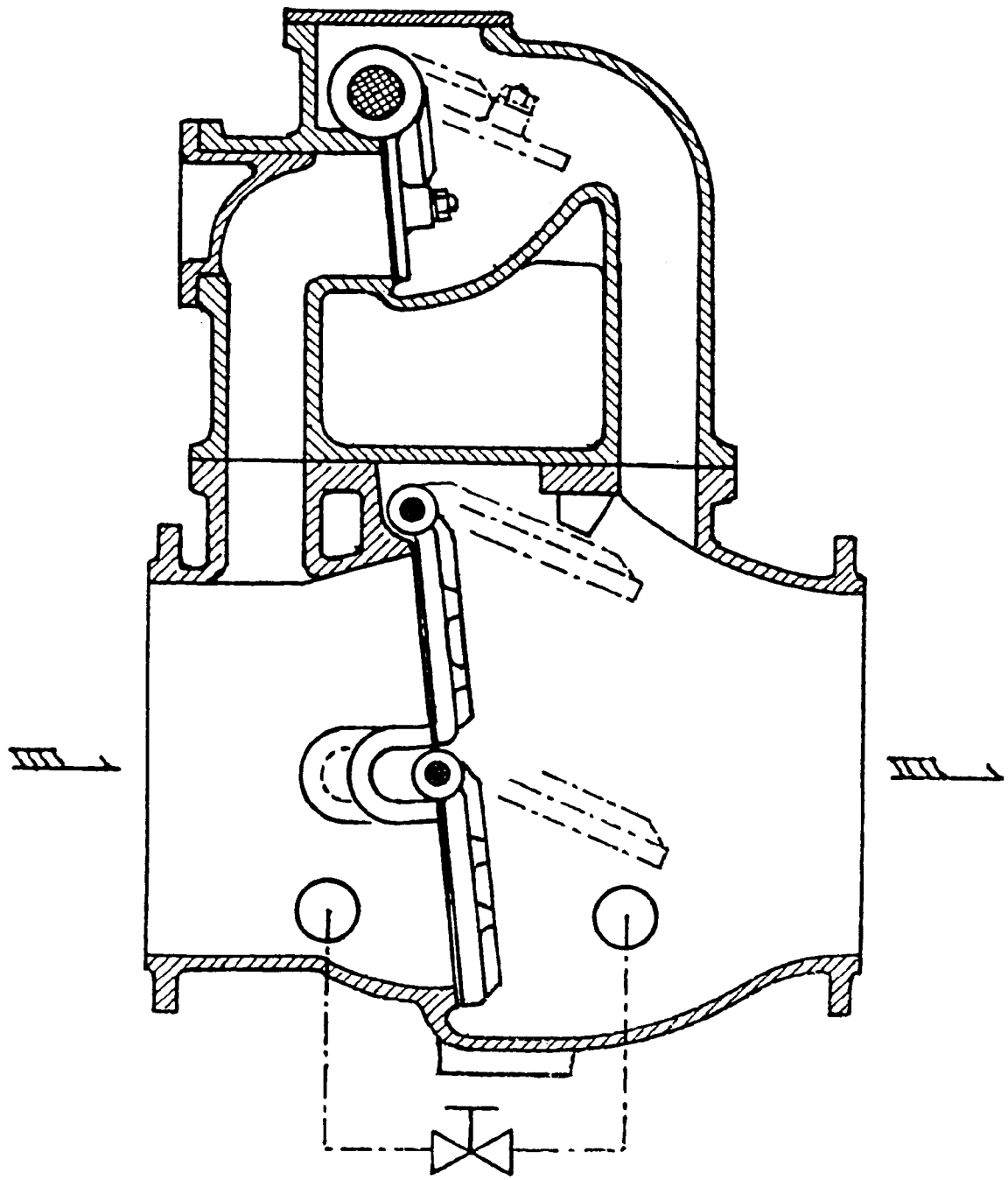
FIG. 5 is a vertical sectional view of a prior art slow-closing bypass check valve.

A water hammer preventing check valve in an embodiment according to the present invention will be described with reference to FIGS. 1 and 3. FIG. 1 shows a water hammer preventing check valve provided with a main valve unit A and a bypass valve unit B, and FIG. 3 shows the main valve unit A.

The main valve unit A is based on the technical idea of a "Swing Type Water Hammer Preventing Check Valve" disclosed in JP-63-60274 B and so on. This main valve unit A has a main valve element 3 and a main valve seat 2. The main valve clement 3 is seated substantially completely on the main valve seat 2 at the moment the velocity of the inertial flow of a fluid flowing in a discharge direction decreases to naught to avoid the occurrence of water hammer due to delay in the closing operation of the main valve unit A.

More specifically, a main valve casing 1 is installed in a pipeline, not shown, and defines a passage extending from an inlet passage 5 to an outlet passage 6. The single main valve element 3 is supported for swing motion by a main valve shaft 4 on the main valve casing 1 on the outlet side of the main valve seat 2 disposed at an inclination to a direction from the inlet passage 5 toward the outlet passage 6.

The main valve element 3 is formed in a shape which does not exert a high resistance against the flow and is formed in the least possible inertial mass to eliminate factors that obstruct the closing motion of the main valve element 3 and to enhance the capability of the main valve element 3 to follow the variation of the flow. The main valve element 3 is thus formed and supported so that its center of gravity is at a position downstream of the main valve shaft 4 with respect to the direction of the flow and its weight acts as a valve closing force that biases the main valve element 3 in a closing direction. The main valve element 3 is designed so that the magnitude of the valve closing force can be balanced by a force exerted by the fluid flowing at a predetermined maximum flow rate on the main valve element 3 in a valve opening direction, i.e., a valve opening force, when the main valve element 3 is fully open.

The bypass valve unit 1 has a bypass valve casing 11 installed so as to extend between the inlet passage 5 and the outlet passage 6 of the main valve unit A, and the bypass valve casing 11 defines a passage from an inlet passage 15 to an outlet passage 16. A bypass valve seat 12 is disposed between the inlet passage 15 and the outlet passage 16.

A bypass valve element 13 is supported for linear movement, i.e., vertical movement as viewed in FIG. 1, in the bypass valve casing 11. The bypass valve element 13 has an end surface which is seated on the bypass valve seat 12 when the fluid reverses to the side of the inlet passage 15. A bypass valve shaft 14 is extended through a central part of the bypass valve element 13 and the bypass valve element 13 is fixed to the bypass valve shaft 14. The bypass valve shaft 14 has one end linked to a damping device 31 for damping a valve closing motion.

The damping device 31 is of a generally known type comprising, as principal components, a cylinder having a closed chamber, a piston rod slidably extended through a cylinder lid attached to one end of the cylinder, and a piston fixedly connected to the piston rod and fitted in the cylinder. The chamber of the cylinder is filled up with a fluid, such as oil or water. A needle valve or the like exerts resistance against the flow of the fluid between a space on one side of the piston and a space on the other side of the same for a damping action. The magnitude of the damping force is adjusted by adjusting the opening of the needle valve.

In the embodiment shown in FIG. 1, the bypass valve shaft 14 comes into contact with the piston rod of the damping device 31 and applies a force to the piston rod of the damping device 31 when the bypass valve shaft 14 moves for a valve closing motion. The piston rod of the damping device is biased upward by a biasing member 33 to return the piston of the damping device 31 automatically to its original position when the supply of the fluid is resumed and the bypass valve shaft 14 is raised and separated from the piston rod to remove the force to the piston rod.

The damping device 31 employed in the present invention is connected to the bypass valve shaft 14 and the bypass valve element 13 in a straight direction in which the damping force acts. Therefore, any extraordinaiy force, such as torsional moment, will not act on the component members when the damping device 31 functions. Therefore, there is no severe requirement on the strength of the members, and hence the bypass valve unit B can be formed in a simple, compact construction.

The operation of the present invention will be described with reference to FIG. 1 showing the embodiment.

Both the main valve unit A and the bypass valve unit B of the water hammer preventing check valve of the present invention are open when a pump or the like is in operation to feed the fluid. The fluid flows from the passage 5 into the passage 6, and from the passage 5 via passages 15, 12$i$ and 16 into the passage 6. When the feed of the fluid is stopped, the main valve unit A closes first and, subsequently, the bypass valve unit B closes gradually under the damping effect of the damping device 31 to prevent water hammer and pressure rise due to the reverse flow of the fluid from the discharge side.

Since the main valve element 3 of the main valve unit A is always biased in the valve closing direction and is formed in a shape which is subject to a low shape drag and provides a low inertial resistance, the valve opening force and the valve closing force are balanced and the main valve element 3 is held afloat in the fluid flowing past the main valve element 3 when the main valve unit is open, and the main valve element 3 starts a valve closing motion substantially simultaneously with the sudden start of deceleration of the flow after the stoppage of feed of the fluid. Then, the main valve element 3 is seated by the valve closing force on the main valve seat 2 inclined to the passage without delay and without causing water hammer. Since the main valve element 3 closes substantially completely at the moment the flow in the discharge direction stops and before the start of the reverse flow, a water hammer is avoided by the main valve unit A, and hence the bypass valve unit B needs only to avoid a pressure rise which occurs on the discharge side after the main valve unit A has been closed. Accordingly, the bypass valve unit B may be smaller than a prior art bypass valve unit of the same capacity. More specifically, the bore diameter of the bypass valve unit B may be, for example, about ⅛ to about ¹⁄₁₀ of that of the main valve unit A, which is not restrictive because the bore diameter ratio between the bypass valve unit B and the main valve unit A is dependent on pipeline conditions. (In the drawings illustrating the embodiments of the present invention, bypass valve units B are shown on a somewhat enlarged scale to facilitate the understanding of their constructions.)

Since the bypass valve unit B may be of a compact construction, the component parts of the bypass valve unit B and the damping device can be easily and economically designed and manufactured, and the bypass valve unit B does not need much space and can be attached to the main valve unit A at an optional position, such as a position on the side surface of the main valve unit A, and maintenance and inspection of the water hammer preventing check valve and the adjustment of the damping device can be easily carried out even if the water hammer preventing check valve is of a large size.

A water hammer preventing check valve in another embodiment according to the present invention will be described with reference to FIG. 2.

The operating principle of the water hammer preventing check valve in this embodiment is similar to that of the water hammer preventing check valve in the first described embodiment shown in FIG. 1, except that the starting position of the bypass valve element 13 of the bypass valve unit employed in this embodiment, from which the bypass valve element 13 starts moving when the reverse flow starts, can be adjusted by a manual adjusting operation according to pipeline conditions to limit the quantity of the fluid that reverses to such a least possible extent as to not cause water hammer and pressure rise. When it is desired to reduce the quantity of the fluid that reverses, an adjusting shaft 21 is lowered by turning a handle 22. The lower end of the adjusting shaft 21 serves as a stopper which limits the upward movement of the bypass valve element 13.

It is another effect of the adjustment of the starting position of the bypass valve element 13 that the deviation of the timing of seating of the main valve element 3 on the main valve seat can be corrected to make the main valve element 3 operate in an optimum mode by adjusting the starting position of the bypass valve element 13 at the site of installation when the main valve element 3 is unable to execute the closing operation properly due to an unstable flow of the fluid in the pipeline, and the main valve element 3 is seated on the main valve seat in an incorrect timing.

Figure 2:
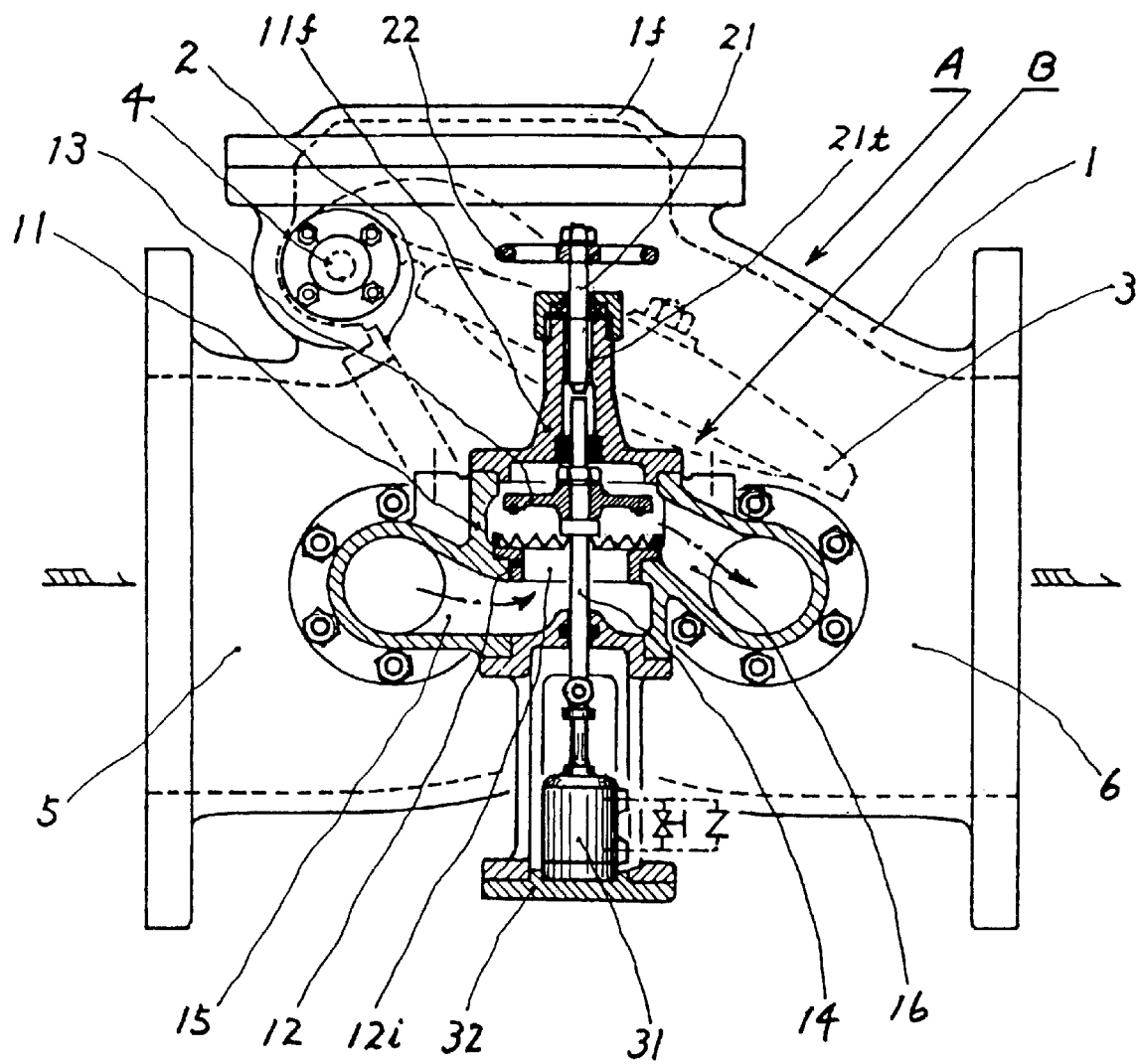
FIG. 2 is a view of a water hammer preventing check valve in another embodiment according to the present invention, showing a main valve unit in a fully open state in side elevation and a bypass valve unit in a fully open state in vertical section.

An adjusting shaft operating mechanism employed in the water hammer preventing check valve shown in FIG. 2 is of an internal thread type, in which a threaded part 2 it of the adjusting shaft 21 is in engagement with an internally threaded part of a bypass valve casing cap 11f, and the adjusting shaft 21 is rotated for vertical movement by turning the handle 22. Naturally, the adjusting shaft operating mechanism may be of an external thread type which by turning the handle 22 moves vertically the adjusting to shaft 21 restrained from rotation.

In FIG. 2, the damping device 31 is coupled directly with the bypass valve shaft 14, and the damping device 31 is not provided with any member corresponding to the biasing member 33 for automatically returning the piston to its original position. The bypass valve element 13 of the bypass valve unit employed in this embodiment moves slowly in both the opening operation and the closing operation.

A prior art technique, such as forming projections like the teeth of a comb on the bypass valve element 13 or the valve seat 12, may be applied to the bypass valve unit to prevent the hunting motion of the bypass valve element 13 which is liable to occur when the bypass valve element 13 is almost seated on the valve seat 12 and the flow of the fluid through the bypass valve unit is reduced. In FIG. 2, projections like the teeth of a comb are formed in the valve seat.

The water hammer preventing check valve in this embodiment is the same in other respects of construction and function as that in the embodiment shown in FIG. 1 and hence the further description thereof will be omitted.

As is apparent from the foregoing description, the water hammer preventing check valve of the present invention exercises remarkable functions and effects in preventing water hammer and pressure rise due to the reverse flow of the fluid, and various changes may be made in the design thereof and known techniques may be employed to meet various practical requirements in conformity with the gist of the present invention In the main valve units A shown by way of example in FIGS. 1 to 3, factors obstructing the valve closing motion are reduced to the least possible extent (that is, the main valve element 3 is designed so that the main valve element 3 has an adjusted shape and a reduced mass, provides the least possible inertial resistance, and is subject to the lowest possible shape drag) to enable the main valve element 3 to be moved down only by its own weight for a valve closing motion and to exercise valve closing performance according to the deceleration of the fluid flow in the pipeline substantially without delay. If the water hammer preventing check valve is to be used under further severe operating conditions, for example, if a reverse flow starts in a very short time after the stoppage of feeding the fluid, a valve closing force enhancing member, such as a weight or a spring 7, may be interposed between the main valve casing 1 (or a valve casing cap 1f) and the main valve element 3 to enhance and adjust the valve closing force. If such a valve closing force enhancing member is employed, the positions of points to which the valve closing force enhancing member applies a force can be determined properly so that the least possible valve closing force acts on the main valve element 3 when the main valve element 3 is nearly fully opened to reduce a loss due to the resistance exercised by the main valve element 3, and that the greatest necessary valve closing force acts on the main valve element 3 when the main valve element 3 is nearly completely closed to enable the main valve element 3 to achieve a desirable valve closing operation.

The main valve seat 2, which is an important member to close the main valve unit in quick response to the change of flow without delay, is disposed at an inclination to the direction of flow from the passage 5 toward the passage 6. The inclination of the main valve seat 2 is dependent on the required operating conditions. Although not restrictive, it is desirable that the main valve seat 2 is inclined to a plane perpendicular to a line of flow from the passage 5 toward the passage 6 at an angle in the range of 20° to 30° to enable the water hammer preventing check valve to be used in either a vertical position or a horizontal position under general operating conditions.

The main valve element 3 may be of any one of various known constructions. The main valve element 3 shown in FIG. 3 has a valve part and an arm part, the valve part and the arm part are joined together so as to be slightly movable relative to each other. Such a main valve element 3 can be fabricated by a simple fabricating means and is capable of being closely seated on the main valve seat 2. When the water hammer preventing check valve is of a small size or when the main valve element 3 can be precisely formed so as to be closely seated on the main valve seat 2 by precision machining, the main valve element 3 may be of an integral construction, not shown, integrally comprising the valve part and the arm part.

Needless to say, the technical idea of the present invention is effective also when the main valve unit A is of a type other than a swing type, such as a lift type or an eccentric butterfly type.

Since the bypass valve unit B is compact, the position of the bypass valve unit B on the main valve unit A can be selectively and properly determined; the bypass valve unit B may be attached to an upper or a lower part of the main valve unit A instead of attaching the same to the side of the main valve unit A as shown in the drawings. The bypass valve element 13 may be moved horizontally or obliquely instead of vertically as shown in the drawings.

In the damping devices 31 shown in FIGS. 1 and 2, the cylinder is of a sealed type and a damping fluid is sealed in the cylinder. The damping device 31 may be built in the bypass valve casing 11 and the fluid flowing through the passage 15 toward the to passage 16 may be used as the damping fluid to construct the damping device 31 in a further compact construction. The damping device 31 need not be limited to a piston-and-cylinder type as shown in the drawings, and a damping device of any type other than the piston-and-cylinder type may be used provided that the damping device has the same damping effect. Although it is desirable, in view of preventing the leakage of the damping fluid, to set the damping device 31 on a support member 32 placed in a lower part of the bypass valve casing 11 with its piston rod extended upward as shown in the drawings, a position of the damping device 31 need not necessarily be limited thereto.

Means for adjusting the damping force of the damping device 31 need not necessarily be limited to the needle valve attached to the damping device 31 as shown in FIGS. 1 and 2; the damping force of the damping device 31 may be adjusted by forming a small damping force adjusting hole in the piston of the damping device 31, replacing the piston with another piston of a different diameter or replacing the damping fluid with another damping fluid of a different viscosity. The damping force may be variable during the stroke of the piston so that the damping force increases as the bypass valve element 13 approaches the valve seat 12 or so that the damping force is reduced immediately before the bypass valve element 13 is seated on the valve seat 12 to avoid the chattering of the bypass valve element 13 liable to be caused by the rapid flow of the fluid when the bypass valve element 13 approaches a position close to tech valve seat 12. A check valve which allows the damping fluid to flow in a direction in which the damping fluid flows when the piston of the damping device 31 is returned to its original position may be connected in parallel to the needle valve to enable the quick automatic return of the piston of the damping device 31 to its original position.

The bypass valve element 13 and the bypass valve shaft 14 may be connected to the damping device 31 by a connecting mechanism shown in FIG. 1 which presses the bypass valve shaft 14 against the damping device 31 during a valve closing operation, a connecting mechanism shown in FIG. 2 which couples the bypass valve shaft 14 directly with the damping device 31, a connecting mechanism which connects the bypass valve shaft 14 to the damping device 31 by a transmission lever or any suitable connecting mechanism.

A biasing member 17 shown in FIG. 1 keeps the bypass valve element 13 settled in a closing position while the bypass valve element 13 is not loaded and prevents the bypass valve element 13 from colliding against an upper part of the bypass valve casing 11 at the start of feeding the fluid. However, the biasing member 17 is not an essential member in view of the operating principle of the present invention and may be omitted. If it is difficult for the bypass valve element 13 to open due to the drop of the pressure difference between the inlet passage and the outlet passage immediately after the opening of the main valve unit A when the fluid is fed, the biasing member 17 may be omitted as shown in FIG. 2 or the bypass valve element 13 may be biased in the valve opening direction.

A small bypass valve 18, i.e., a drain valve, may be connected to the main valve unit A or the bypass valve unit B to drain the water hammer preventing check valve when inspecting the water hammer preventing check valve. In FIG. 1, the bypass valve 18 is connected to the bypass valve unit B.

Sealing members to be placed in joints requiring liquid-tight sealing in the water hammer preventing check valve may be elastic members, such as O-rings and packing members. If surfaces of members in direct contact with each other are able to form a liquid-tight joint, the sealing member may be omitted.

Although the present invention has been described in its preferred embodiments, many changes are possible in the design thereof without departing from the scope and spirit of the present invention, and the present invention is not limited in its practical application to those embodiments specifically described herein.

INDUSTRIAL APPLICABILITY

As is apparent from the foregoing description, the present invention provides an ideal water hammer preventing check valve capable of drastically solving all the problems in the prior art and of preventing both water hammer and pressure rise when the feed of the fluid is interrupted under any pipeline conditions.

The main valve element of the main valve unit is seated substantially completely on the main valve seat at the moment the velocity of the inertial flow of the fluid in the discharge direction decreases to naught. Therefore, the bypass valve unit may be of a compact construction, the bypass valve unit can be attached to an optional part of the main valve unit, such as the side surface of the main valve unit, work for the maintenance and inspection of the water hammer preventing check valve and work for the adjustment of the damping device can be easily achieved.

The starting position from which the bypass valve element starts closing when the fluid starts reversing can be adjusted and limited at the site of installation so that the quantity of the fluid that reverses is limited to the least value which will not cause water hammer and pressure rise.

The main valve unit can be easily formed in a large bore diameter and in a large size by employing the bypass valve unit provided with a compact damping device. Since there are no severe conditions on the strength of the operating members, the design, manufacture, installation, adjustment, maintenance and management can easily and economically be achieved and the effect of the present invention is very remarkable as compared with that of the prior art.

We claim:

1. A check valve which opens when a fluid is fed forward and closes when feed of the fluid is stopped to prevent the fluid from reversing, comprising:

a main valve unit and a bypass valve unit disposed in parallel;

said main valve unit including an inlet passage, an outlet passage, an inclined main valve seat disposed between said inlet passage and said outlet passage having an opening, a single main valve element for opening and closing said opening of the main valve seat, and biasing means for constantly biasing said main valve element in a valve closing direction, said biasing means having such a magnitude that a valve closing force produced by said biasing means is balanced with a valve opening force exerted by the fluid flowing at a maximum flowrate through said opening toward the outlet passage when the main valve unit is fully open, so that the main valve element is held afloat in the fluid flowing past the main valve element, whereby the main valve element is substantially completely seated on the main valve seat at the moment the velocity of an inertial flow of the fluid in a discharge direction decreases to naught after the feed of the fluid has been stopped; and said bypass valve unit including a bypass valve seat disposed between said inlet passage and said outlet passage and having an opening, a bypass valve element linearly movable in opposite directions to open and close said opening of the bypass valve seat, and a damping device linked to the bypass valve element for damping linear movement of the bypass valve element so that the bypass valve element may gradually close the opening of the bypass valve seat in the direction of the reverse flow of the fluid after the start of the reverse flow;

whereby water hammer and pressure rise due to the reverse flow occurring open stoppage of the feed of the fluid are prevented.

2. The water hammer preventing check valve according to claim 1, further comprising an opening adjusting mechanism for adjusting an opening of the bypass valve element of the bypass valve unit.

3. The water hammer preventing check valve according to claim 1, further comprising a valve closing force enhancing member for adjusting a force of said biasing means.

4. The water hammer preventing check valve according to claim 2, further comprising a valve closing force enhancing member for adjusting a force of said biasing means.

\* \* \* \* \*

UNITED STATES PATENT AND TRADEMARK OFFICE
CERTIFICATE OF CORRECTION

PATENT NO : 6,102,072
DATED : August 15, 2000
INVENTOR(S): Hiroshi Yokota, et al.

It is certified that error appears in the above-identified patent and that said Letters Patent are hereby corrected as shown below:

Title page, Item [54] TITLE

Change "WATER-HAMMERLESS CHECK VALVE"
    to --WATER HAMMER PREVENTING CHECK VALVE--.

Title page, Item [22] PCT Filed:

Change "Apr. 9, 1997" to --Apr. 8, 1997--.

Column 12, Claim 1, Line 2 of the Letters Patent Document

Change "open" to --upon--.

Signed and Sealed this

Seventeenth Day of April, 2001

Attest:

NICHOLAS P. GODICI

*Attesting Officer*    *Acting Director of the United States Patent and Trademark Office*